United States Patent
Pang et al.

(10) Patent No.: US 8,700,900 B2
(45) Date of Patent: Apr. 15, 2014

(54) COMMUNICATING ADMISSION DECISIONS AND STATUS INFORMATION TO A CLIENT

(75) Inventors: Tak Ming Pang, Palo Alto, CA (US);
Bhavik Fajalia, Bangalore (IN)

(73) Assignee: Cisco Technology, Inc., San Jose, CA (US)

(*) Notice: Subject to any disclaimer, the term of this patent is extended or adjusted under 35 U.S.C. 154(b) by 219 days.

(21) Appl. No.: 12/820,228

(22) Filed: Jun. 22, 2010

(65) Prior Publication Data

US 2011/0276801 A1     Nov. 10, 2011

(51) Int. Cl.
*H04L 9/32* (2006.01)

(52) U.S. Cl.
USPC ........................................... 713/168

(58) Field of Classification Search
USPC ........................................... 713/168
See application file for complete search history.

(56) References Cited

U.S. PATENT DOCUMENTS

| | | | | |
|---|---|---|---|---|
| 4,488,232 A | * | 12/1984 | Swaney et al. | 709/225 |
| 5,917,820 A | * | 6/1999 | Rekhter | 370/392 |
| 6,088,337 A | * | 7/2000 | Eastmond et al. | 370/280 |
| 6,920,493 B1 | * | 7/2005 | Schwab | 709/223 |
| 2004/0125760 A1 | * | 7/2004 | Newberg et al. | 370/312 |
| 2009/0013356 A1 | * | 1/2009 | Doerr et al. | 725/62 |
| 2010/0082760 A1 | * | 4/2010 | Martino et al. | 709/206 |

OTHER PUBLICATIONS

M. Handley et al., "Session Announcement Protocol" RFC 2974, Oct. 2000.
M. Handley et al., "SDP: Session Description Protocol" RFC 2327, Apr. 1998.

* cited by examiner

*Primary Examiner* — Amare F Tabor
*Assistant Examiner* — Abiy Getachew
(74) *Attorney, Agent, or Firm* — Tucker Ellis LLP

(57) ABSTRACT

In an example embodiment, a technique that employs a SAP/SDP packet to communicate data to a client device when a request for a multicast stream, such as a video stream, is denied. Rather than announcing a program, the SAP/SDP packet reports a status to the client device. The SAP/SDP packet may suitably comprise data representative of the video name, and a reason code, enabling the client device to provide an output, e.g. a text string, to a user associated with the client device indicating the reason for the denial. In addition, contact information such as an email address and a uniform resource locator (URL) pointing to a predetermined web page may also be included in the SAP/SDP packet that can inform the associated user of the client device where additional information can be obtained for the denial.

18 Claims, 5 Drawing Sheets

```
v=0
o=WirelessController 2890844526 2890842803 IN IP4 126.16.64.4          302
s=Video Denial: Cisco All Hands (No Bandwidth)              304
i=To client 125.64.64.4: you are denied to access a broadcast video
u=http://www.cisco.com/staff/iptv-program/info/denial-notice          306
e=chamber@cisco.com (John Chamber)         308
c=IN IP4 224.2.13.12
t=2833393496 2833404696
a=recvonly
m=video 51332 RTP/AVP 31
a=orient:portrait
```

COMMUNICATING ADMISSION DECISIONS AND STATUS INFORMATION TO A CLIENT

TECHNICAL FIELD

The present disclosure relates generally to streaming data communications such as streaming video,

BACKGROUND

Session Announcement Protocol (SAP) defined in Request for Comments "RFC" 2974 is a standard announcement protocol commonly used in Internet Protocol Television (IPTV) networks. Session Description Protocol (SDP) defined in RFC 2327 defines the format of data and television program information inside a SAP packet. IPTV viewer applications like VLC media player (available from www.videolan.org; 18 rue Charcot, 75013 Paris, France) can receive program listing data through SAP packets and display program listings to a user.

BRIEF DESCRIPTION OF THE DRAWINGS

The accompanying drawings incorporated herein and forming a part of the specification illustrate the examples embodiments.

OVERVIEW OF EXAMPLE EMBODIMENTS

Figure 1:
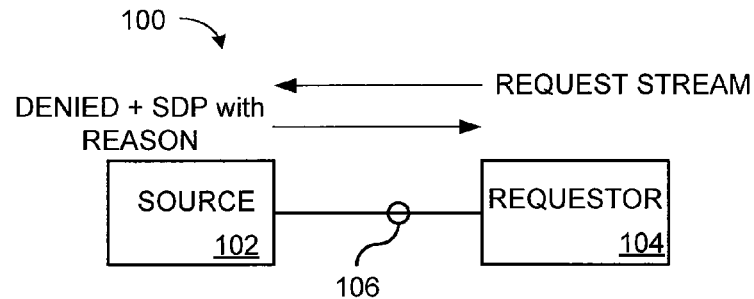
FIG. 1 is a block diagram illustrating an example of a system configured to implement an example embodiment.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein, an apparatus comprising a transceiver, and logic coupled to the transceiver. The logic is configured to receive a request for a data stream from a requestor via the transceiver. The logic is configured to determine whether to provide the data stream to the requestor. The logic sends a Session Announcement Protocol (SAP) packet comprising Session Description Protocol (SDP) data indicating the request for the data stream is denied to the requestor via the transceiver responsive to determining not to provide the data stream to the requestor.

In accordance with an example embodiment, there is disclosed herein, a method comprising receiving a request for a data stream from a requestor, and determining that the request for the data stream is to be denied. A Session Announcement Protocol (SAP) packet comprising Session Description Protocol (SDP) data, wherein the SDP data comprises data indicating the request for the data stream was denied is generated. The SAP packet with the SDP data is sent to the requestor.

In accordance with an example embodiment, there is disclosed herein, an apparatus comprising a transceiver configured to communicate with a source of a stream and logic coupled to the transceiver. The logic when executed operable to send a request to the source for the stream via the transceiver. The logic is further operable to receive a Session Announcement Protocol packet with Session Description Protocol data from a source of the stream and determine from the Session Description Protocol data that the request for the stream was denied.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In an example embodiment, when an Internet Protocol (IP) multicast stream (such as for example a video stream) request is denied, a SAP/SDP packet is generated and sent to the requestor. Rather than announcing a program, the SAP/SDP packet reports a status to the requestor. For example, the SAP/SDP packet may provide data to the client video viewing application indicating a reason why a video request has been denied. In particular embodiments, the SAP/SDP packet further comprises data representative of the video name, and a reason code, enabling the client device to provide an output, e.g. a text string, to a user associated with the client device. In addition, contact information such as an email address and a uniform resource locator (URL) pointing to a predetermined web page may also be included in the SAP/SDP packet that can inform the associated user of the client device where additional information can be obtained for the denial.

Referring to FIG. 1, there is illustrated a system 100 in accordance with an example embodiment. System 100 comprises a source of a data stream, Source 102, such as a video stream, audio stream, audiovisual stream, etc. A device requesting the stream, Requestor 104, is illustrated as being in communication with the source via communication link 106.

In example embodiments described herein, Source 102 and/or Requestor 104 suitably comprise logic for implementing the functionality described herein. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

Communication link 106 can employ suitably any wireless (such Radio Frequency "RF", Infra Red "IR", etc.) or wired technology. In particular embodiments communication link may employ a combination of wired and wireless technologies. For example, referring to FIG. 2 with continued reference to FIG. 1, there is illustrated an example embodiment 200 where requestor 104 communicates with an access point 202 disposed on a network 204 via a wireless link 206. In the illustrated embodiment, a wireless local area network (LAN) controller (WLC) 206, which may in some example embodiments also be co-located with the source of the stream, determines whether or not the request for a stream will be granted. In other embodiments, source 102 may be coupled to network 204 without passing through WLC 206.

In an example embodiment, requestor 104 may send a request for a stream (e.g. a video stream, audio stream, audio-visual stream or other type of data stream such as a stock ticker) to AP 202. AP 202 upon receiving the request may determine whether it has sufficient bandwidth to provide the requested stream to requestor 104. If AP 202 does not have sufficient bandwidth, AP 202 may generate a Session Announcement Protocol (SAP) packet comprising Session Description Protocol (SDP) data indicating the request is denied. The SDP/SAP packet may further comprise data indicating a reason why the request for the data stream was denied (e.g. insufficient bandwidth in this example). In particular embodiments, the data indicating a reason why the request was denied is placed into a SDP session name (s=) field. In an example embodiment AP 202 sends the SAP/SDP packet as a unicast packet. For example, the layer 2 (Media Access Control or "MAC") address of the unicast packet may suitably comprise a layer 2 (MAC) unicast address of the requestor. As used herein, a layer of a packet refers to the layers defined by the Open Systems Interconnection (OSI) Reference Model. In an example embodiment, the layer 3 address (for example the Internet Protocol or "IP" address) of the unicast packet may suitably comprise a predefined (or known) multicast IP address such as 224.2.127.254.

In an example embodiment, AP 202 may encrypt the SAP/SDP packet with a client key for requestor 104. Using a client key for requestor 104 would prevent other recipients of the SAP/SDP packet, some of whom may actually be subscribing to the same stream, from decrypting the message and receiving erroneous data.

Although the example just set forth indicated that AP 202 may determine not to provide the data stream to requestor 104 because of insufficient available bandwidth, other reasons that AP 202 may decide not to provide the stream include, but are not limited to determining the data rate for requestor 104 is insufficient for the stream, determining there is a break in a connection between source 102 of the data stream and requestor 104, determining the requestor does not have sufficient resources for the data stream, and/or that requestor 104 is incapable of processing the stream (for example the current version of the application processing the stream on requestor 104 is outdated. For example, AP 202 may detect the current signal strength of a signal received from requestor 104 and determining from the signal strength (or received signal strength indication or "RSSI") that link 206 to the requestor is incapable of providing sufficient resources for the data stream.

As those skilled in the art can readily appreciate, the type of stream being requested/provided as described herein can include, but is not limited to a video stream, an audio stream, an audiovisual stream, and a voice over internet protocol (VoIP) stream, and/or a streaming data stream, such as for example a stock market ticker.

In an example embodiment, requestor 104 is configured to receive the SAP/SDP packet from AP 202 and determine from the Session Description Protocol data that the request for the stream was denied. For example, requestor 104 may be configured to parse the SDP data to determine whether a certain data string is present within a particular field to indicate the request was denied. Requestor 104 may be further configured to determine from the SDP data why the request was denied. For example, as will be described in more detail herein infra, requestor 104 may look for a string in the SDP data that indicates why the request was denied (for example in FIG. 7 the session name (s=) field contains the string "(No Bandwidth)" which requestor 104 can be configured to recognize.

In an example embodiment, requestor 104 comprises a user interface. This can allow requestor 104 to output data to an associated user of the device requestor 104 is implemented on to indicate the request for the stream was denied. For example, if the user interface comprises a display, a message may be displayed on a display. As another example, an audio output may be produced.

If AP 202 does not reject the request (for example AP 202 may not be configured to respond to such requests or AP 202 may determine it has sufficient bandwidth for providing the stream), the request from requestor 104 is forwarded to Wireless Local Area Network Controller (WLC) 206. In an example embodiment, WLC 206 may determine whether AP 202 has sufficient bandwidth to provide the stream and/or weather network 204 has sufficient bandwidth to provide the stream. If WLC determines not to provide the stream to requestor 104, WLC 204 generates a Session Announcement Protocol (SAP) packet comprising Session Description Protocol (SDP) data indicating the request is denied. The SDP/SAP packet may further comprise data indicating a reason why the request for the data stream was denied (e.g. insufficient bandwidth in this example). In particular embodiments, the data indicating a reason why the request was denied is placed into a SDP session name (s=) field. In an example embodiment the SAP/SDP packet is a unicast packet. For example, the layer 2 (Media Access Control or "MAC") address of the unicast packet may suitably comprise a layer 2 (MAC) unicast address of the requestor. In an example embodiment, WLC 206 may encrypt the SAP/SDP packet with a client key for requestor 104.

If WLC 206 decides that the stream can be provided to requestor 104, WLC 206 forwards the request to source 102. Source 102 may also determine whether or not to provide the stream for the reasons already set forth herein and may generate a SAP/SDP packet as described herein. Moreover, source 102 may also decide not to provide the stream to requestor 104 for other reasons. For example, requestor 104 may belong to a group that only a limited number of members are allowed to receive the stream at the same time. Source 102 may be configured to enforce the limit, and in an example embodiment provides requestor with an SAP/SDP packet that the request is denied, and may optionally include a reason in the SAP/SDP packet such as "exceeded maximum number of allowed users."

In an example embodiment, the SDP data comprises a Start time field and a Stop time field. If a request for a stream is granted, these fields can be employed to indicate the beginning and ending time for the grant. If a request is denied, one of the fields, e.g., Start time, can be employed to indicate the time that the request was denied.

Figures 3, 9, 10:
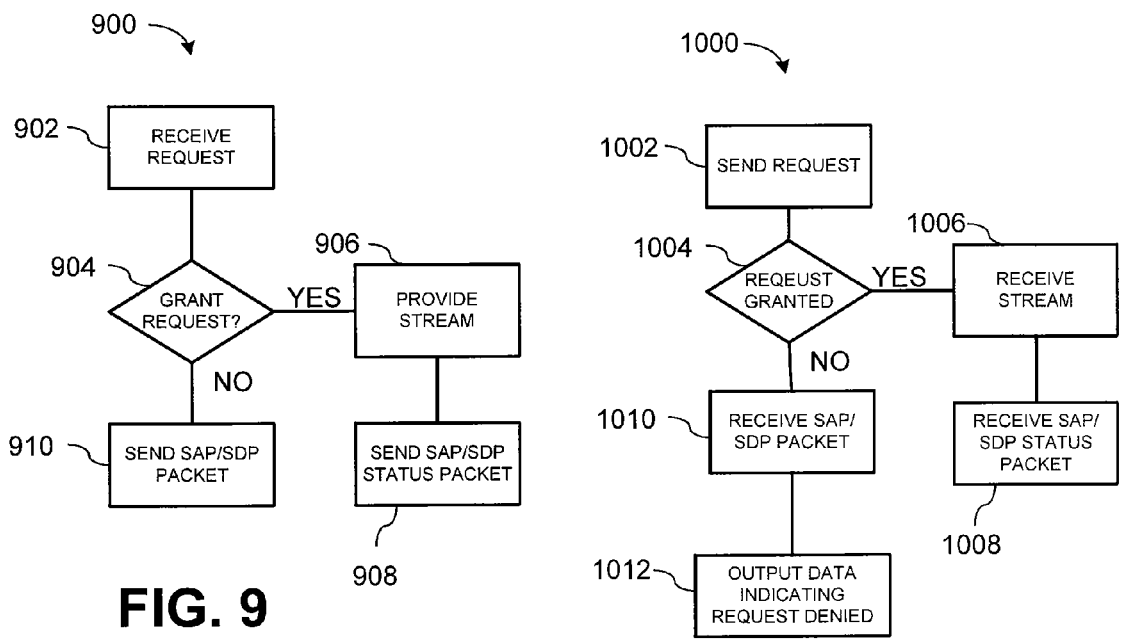
FIG. 3 illustrates an example of Session Description Protocol (SDP) data sent to a requestor when a request for a stream is denied.
FIG. 9 illustrates an example methodology performed by a device receiving a request for a stream.
FIG. 10 illustrates an example methodology for a device requesting a stream that receives in response a Session Announcement Protocol with Session Description Protocol data indicating the request was denied.

FIG. 3 illustrates an example of Session Description Protocol (SDP) data 300 sent to a requestor (such as for example requestor 104 in FIG. 1) when a request for a stream is denied. The SDP data 300 provided in this example comprises owner/creator of session identifier (o=) data 302, session name (s=) 304, uniform resource locator (URL) or web address (u=) 306, and an email address (e=) 308. In an example embodiment, data representative of why the request was denied may also be included (in this example (No Bandwidth) is included in session name 304). In an example embodiment, a device requesting a stream (for example requestor 104 in FIG. 1) may be configured to parse the SDP data to search the session name field for a particular string such as "Denial" or "Denied" to determine whether a request was denied. As another example, the requestor may search the session information (i=) data 310. Based on the SDP data 300 provided by the source (or a device between the requestor and source that denies the request), the requestor may provide an output to a user associated with the device allowing the user to determine that the request was denied, and possibly the reason why the request was denied.

Figure 4:
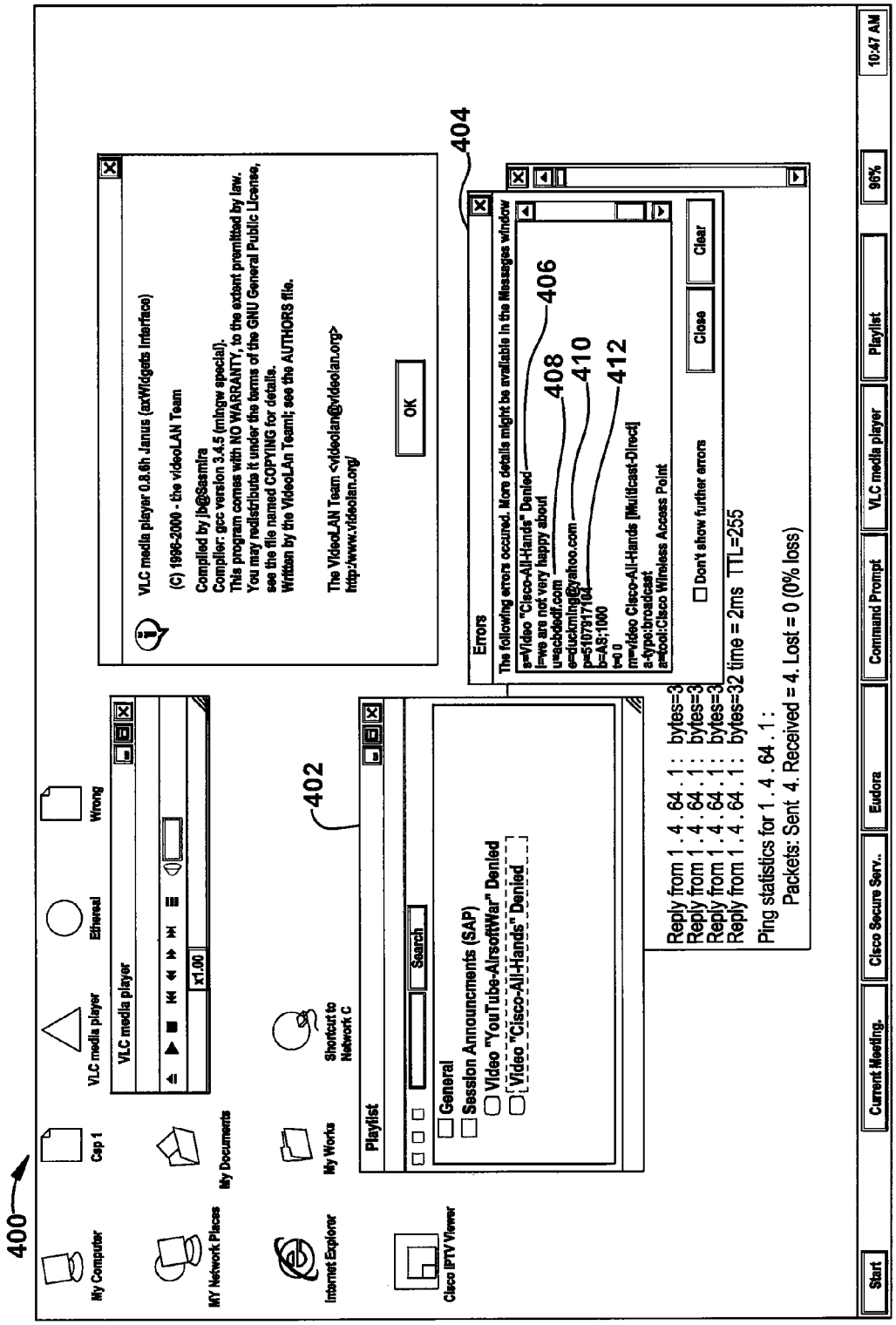
FIG. 4 illustrates an example of screen snapshot of a client device responsive to receiving Session Description Protocol (SDP) data indicating a request for a stream is denied.

For example, FIG. 4 illustrates an example of screen snapshot 400 of a requesting device responsive to receiving Session Description Protocol (SDP) data indicating a request for a stream is denied. In the illustrated example, there is illustrated a Playlist Window 402 and an Error Window 404. Playlist window 402 displays session name data from the SAP/SDP packet. Error window 404 displays a plurality of data fields acquired from the SDP data. In the illustrated example, the data fields comprise session name (s=Video "Cisco-All-Hands" Denied) data 406, a uniform resource locator (u=abcdedf.com) data 408, an email address (e=duckming@yahoo.com) data 410, and telephone number (p=5107917184) data 412. The data provided in error window 404 can enable a user associated with the requesting device to determine that the request was denied as well as provide resources for troubleshooting the error, such as a URL and/or contact information such as an email address and/or a phone number.

Figure 2:
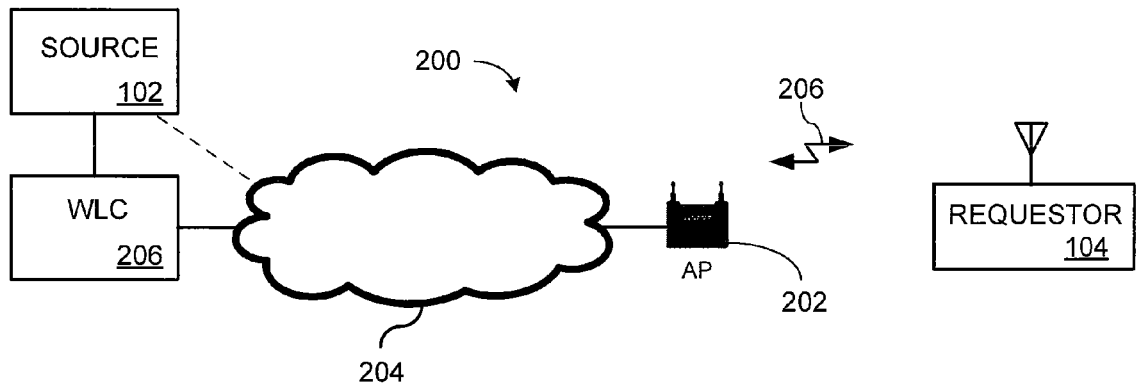
FIG. 2 is a block diagram illustrating an example of a network where the link between the source and the requestor comprises wired and wireless links.
Figure 5:
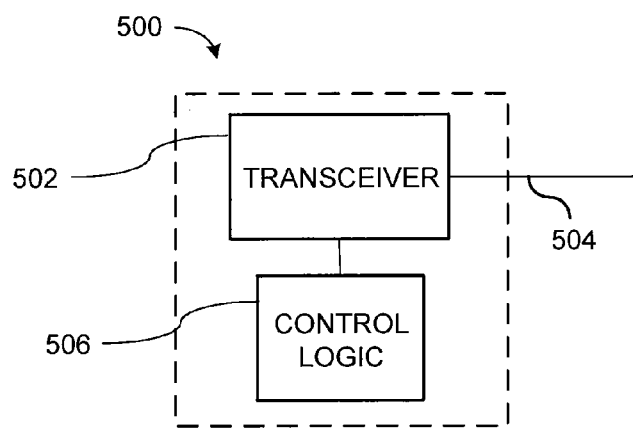
FIG. 5 is a block diagram illustrating an example of an apparatus configured to implement a source of a data stream in accordance with an example embodiment.

FIG. 5 is a block diagram illustrating an example of an apparatus 500 configured to implement a source of a data stream, and/or a device in the path of the data stream, in accordance with an example embodiment. For example, apparatus 500 can be used when implementing source 102 (FIG. 1, FIG. 2), AP 202 (FIG. 2), and/or WLC 206 (FIG. 2).

Apparatus 500 comprises a transceiver (which may be a wired or wireless transceiver) 502 that is configured to communicate with a device requesting a data stream provided by apparatus 500 via communication link 504. Control logic 506 is in communication with transceiver 502 and is operable to receive and respond to requests for a data stream (such a video stream) received by transceiver 502 via communication link 504. Control logic 506 is configured to determine whether to provide the data stream to the requestor. If control logic 506 determines not to provide the data stream to the requestor, control logic 506 is configured to send a Session Announcement Protocol (SAP) packet comprising Session Description Protocol (SDP) data indicating the request for the data stream is denied to the requestor via transceiver 502.

In an example embodiment, the SDP data further comprises data indicating a reason why the request for the data stream was denied. The data indicating a reason why the request was denied may be placed into a SDP session name field.

In an example embodiment, control logic 506 is further configured to send the SAP packet is sent as a unicast packet. For example, a layer 2 address of the unicast packet comprises a unicast address of the requestor. As yet another example, control logic 506 may encrypt the SAP packet with a client key.

Control logic 506 may employ any criteria for deciding whether or not to provide the stream to the requesting device. For example, control logic 506 may determine not to provide the data stream to the requestor based on determining available bandwidth for the requestor is insufficient. As another example, control logic 506 may determine not to provide the data stream to the requestor based on determining available a data rate for the requestor is insufficient. Yet another example, control logic 506 may determine not to provide the data stream to the requestor based on determining a break in a connection between a source of the data stream and the requestor. Still yet another example, control logic 506 may determine not to provide the data stream to the requestor based on determining the requestor does not have sufficient resources for the data stream. As another example, control logic 506 may determine not to provide the data stream to the requestor based on determining a current signal strength (or received signal strength indication or "RSSI") of a signal received from the requestor and determining from the signal strength that a link to the requestor is incapable of providing sufficient resources for the data stream.

The type of stream that is being requested may be any type of streaming data. This may include but is not limited to a video stream, an audio stream, an audiovisual stream, a voice over internet protocol (VoIP) stream, a streaming data (e.g. stock ticker) stream, or a combination of streams.

Figure 6:
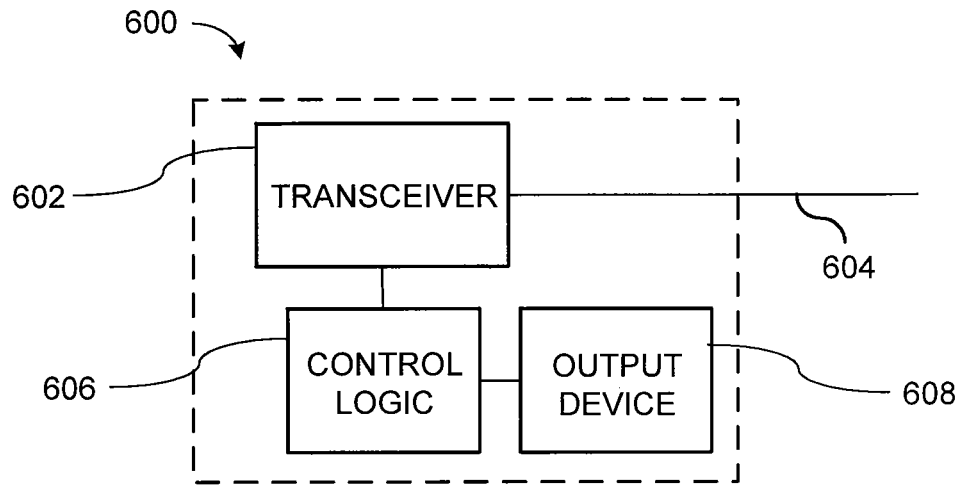
FIG. 6 is a block diagram illustrating an example of an apparatus configured to implement the requestor device of a data stream in accordance with an example embodiment.

FIG. 6 is a block diagram illustrating an example of an apparatus 600 configured to implement the requestor device of a data stream in accordance with an example embodiment. Apparatus 600 comprises a transceiver 602 configured to communicate via link 604 to at least one external device. Link 604 may be any suitable wired or wireless type link and transceiver 602 is configured to communicate via link 604 employing any appropriate protocols. Control logic 606 is coupled to transceiver 602 and is operable to send and receive data via transceiver 602. Control logic may employ transceiver 602 to communicate with external devices via link 604. Output device (such as a user interface) 608 is coupled to control logic 606 and is operable to provide data to an associated user. The data may be provided in one or more forms. For example, output device 608 may provide a visual output, an audio output, or a combination of a digital output and audio output.

In an example embodiment, control logic 606 is operable to send via transceiver 602 a request for a stream such as an audio steam, video stream, audio visual stream, or any type of streaming data stream. Control logic 606 is further operable to receive via transceiver 602 a Session Announcement Protocol packet with Session Description Protocol data. Control logic 606 is configured to determine from the Session Description Protocol data that the request for the stream was denied. In an example embodiment, control logic 606 is operable to output on output device (e.g. a user interface) 608 data indicating the request for the stream was denied. In particular embodiments, control logic 606 is further operable to determine from the SDP data a reason why the request for the data stream was denied. For example, control logic 606 may parse the SDP data fields and look for a predefined data stream or a preformatted data stream (for example the reason may be enclosed in quotes " " or brackets ( ) in the session name field).

Figure 7:
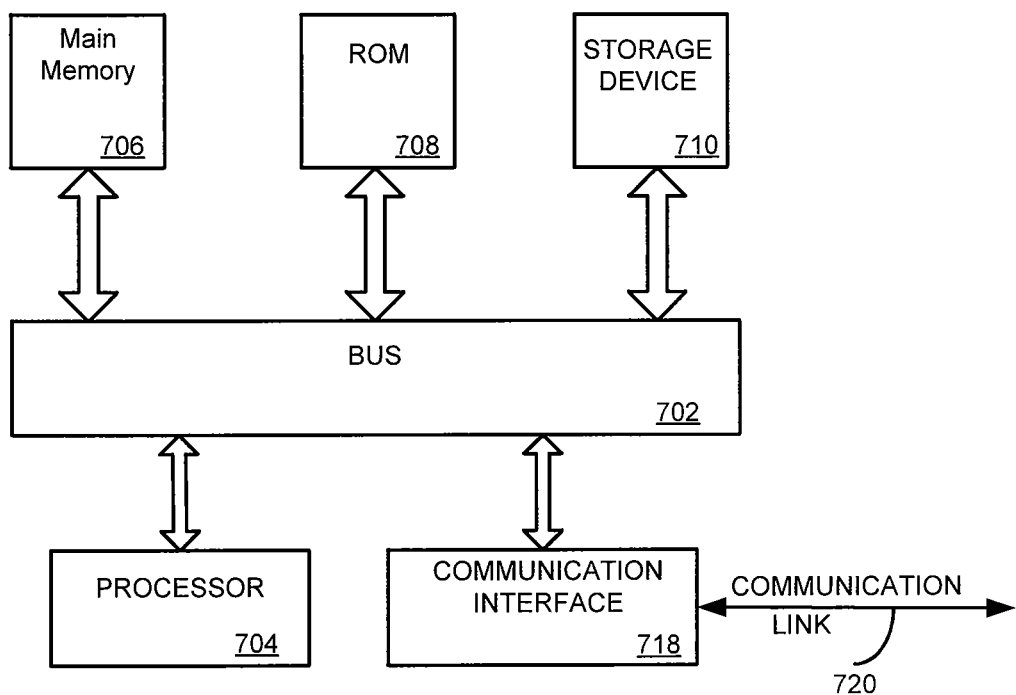
FIG. 7 is a block diagram illustrating an example of computer system for implementing a source of a data stream in accordance with an example embodiment.

FIG. 7 is a block diagram illustrating an example of computer system 700 for implementing a source of a data stream in accordance with an example embodiment. Computer system 700 is suitable for implementing source 102 (FIG. 1, FIG. 2), AP 202 (FIG. 2), WLC 206 (FIG. 2), and/or control logic 506 (FIG. 5).

Computer system 700 includes a bus 702 or other communication mechanism for communicating information and a processor 704 coupled with bus 702 for processing information. Computer system 700 also includes a main memory 706, such as random access memory (RAM) or other dynamic storage device coupled to bus 702 for storing information and instructions to be executed by processor 704. Main memory 706 also may be used for storing a temporary variable or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

An aspect of the example embodiment is related to the use of computer system 700 for communicating admission decisions and status information to a client. According to an example embodiment, communicating admission decisions and status information to a client is provided by computer system 700 in response to processor 704 executing one or more sequences of one or more instructions contained in main memory 706. Such instructions may be read into main memory 706 from another computer-readable medium, such as storage device 710. Execution of the sequence of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 704 for execution. Such a medium may take many forms, including but not limited to non-volatile media, and volatile media. Non-volatile media include for example optical or magnetic disks, such as storage device 710. Volatile media include dynamic memory such as main memory 706. 7As used herein, tangible media may include volatile and non-volatile media. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Computer system 700 also includes a communication interface 718 coupled to bus 702. Communication interface 718 provides a two-way data communication coupling computer system 700 to a communication link 720 that allows computer system 700 to send and receive data from other, external devices.

Computer system 700 can send messages and receive data, including program codes, via communication link 720, and communication interface 718. For example, a server (not shown) might transmit a requested code for an application program through the Internet, to communication link 720, and communication interlace 718. In accordance with an example embodiment, one such downloaded application provides for communicating admission decisions and status information to a client as described herein.

Figure 8:
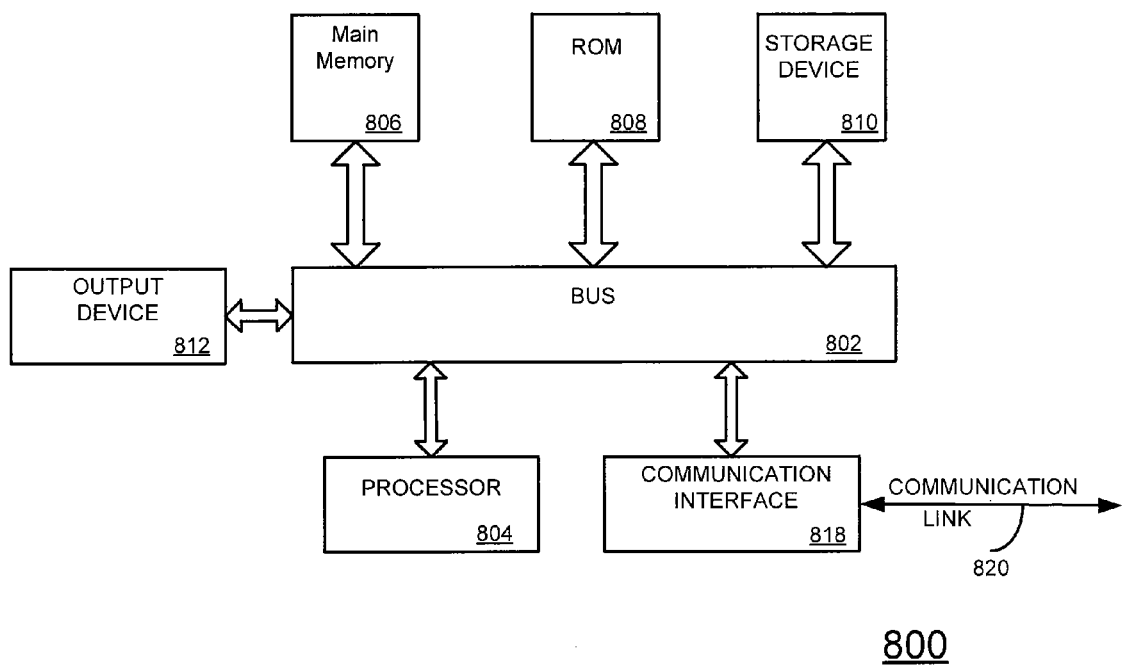
FIG. 8 is a block diagram illustrating an example of a computer system for implementing a requestor of a data stream in accordance with an example embodiment.

FIG. 8 is a block diagram illustrating an example of a computer system 800 for implementing a requestor of a data stream in accordance with an example embodiment. Computer system 800 is suitable for implementing requestor 104 (FIG. 1, FIG. 2) and/or control logic 506 in FIG. 6.

Computer system 800 includes a bus 802 or other communication mechanism for communicating information and a processor 804 coupled with bus 802 for processing information. Computer system 800 also includes a main memory 806, such as random access memory (RAM) or other dynamic storage device coupled to bus 802 for storing information and instructions to be executed by processor 804. Main memory 806 also may be used for storing a temporary variable or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

An aspect of the example embodiment is related to the use of computer system 800 for receiving admission decisions and status information. According to an example embodiment, receiving admission decisions and status information is provided by computer system 800 in response to processor 804 executing one or more sequences of one or more instructions contained in main memory 806. Such instructions may be read into main memory 806 from another computer-readable medium, such as storage device 810. Execution of the sequence of instructions contained in main memory 806 causes processor 804 to perform the process steps described herein. One or more processors in a multi-processing arrangement may also be employed to execute the sequences of instructions contained in main memory 806. In alternative embodiments, hard-wired circuitry may be used in place of or in combination with software instructions to implement an example embodiment. Thus, embodiments described herein are not limited to any specific combination of hardware circuitry and software.

Computer system 800 also includes a communication interface 818 coupled to bus 802. Communication interface 818 provides a two-way data communication coupling computer system 800 to a communication link 820. Communication link 820 enables computer system 800 to communicate with external devices and receive admission decisions and status information.

Computer system 800 may suitably comprise an output device 812. Output device 812 may be any suitable device that allows computer system 800 to communicate admission decisions and status information to an associated user. For example, output device may a visual output device such as a screen, an audio device such as a speaker, or any other suitable device for providing feedback to an associated user. For example, processor 804 may determine from data received via communication link 820 by communication interlace 818 that a request for a video stream was denied. Processor 804 may then communicate data representative of the denial (which may also include a reason for the denial) to an associated user via output device 812.

In view of the foregoing structural and functional features described above, methodologies in accordance with example embodiments will be better appreciated with reference to FIGS. 9 and 10. While, for purposes of simplicity of explanation, the methodologies of FIGS. 9 and 10 are shown and described as executing serially, it is to be understood and appreciated that the example embodiments are not limited by the illustrated order, as some aspects could occur in different orders and/or concurrently with other aspects from that shown and described herein. Moreover, not all illustrated features may be required to implement the methodologies. The methodologies described herein are suitably adapted to be implemented in hardware, software, or a combination thereof.

FIG. 9 illustrates an example methodology 900 performed by a device receiving a request for a stream. For example, methodology 900 may be implemented by source 102 (FIG. 1, FIG. 2), AP 202 (FIG. 2), WLC 206 (FIG. 2), and/or control logic 506 (FIG. 5), and/or computer system 700 (FIG. 7).

At 902, a request for a stream is received. The request may be for an audio stream, video stream, audiovisual stream, data stream, or a combination of streams.

At 904, a determination is made whether to grant the request. The determination may be based on many factors and dependent upon the device receiving the request. For example, a wireless access point (AP) may determine whether there is sufficient bandwidth available to provide the stream. A server that provides the stream may determine if the stream is subject to subscription limits and whether or not the request would exceed a limit—for example for maximum number of users. Other criteria may include, but is not limited to, whether the link to the requestor has a sufficient data rate, whether the requestor has sufficient resources to handle the stream, and/or whether the requestor is capable of processing the stream (for example whether the requestor is running a recent enough version of software).

If the request is granted (YES), at 906 the stream is provided to the requestor at 906. In particular embodiments, a SAP/SDP packet may be sent to the requestor indicating that the request was granted and/or a reason the request was granted as illustrated at 908. In an example embodiment, SAP/SDP packets with status information may be provided to the client either periodically or aperiodically. If the device performing methodology 900 is not the actual source of the stream, the request may be forwarded towards the actual source of the stream (for example a server that is providing the stream).

If the request for the stream is denied (NO), at 910 a Session Announcement Protocol (SAP) packet comprising Session Description Protocol (SDP) data is generated. The SDP data comprising data indicating the request was denied. The SAP packet with the SDP data is sent to the requestor.

In particular embodiments, the SDP data further comprises data representative of a reason why the request for the data stream was denied. For example, data representative of the reason why the request for the data stream was denied can be placed in a SDP session name field.

In an example embodiment, the SAP packet is sent as a unicast packet addressed to the requestor. For example, the SAP packet may be sent to a unicast layer 2 (MAC) address for the requestor. As yet another example, the SAP packet may be encrypted with a client key instead of with a multicast/broadcast key.

FIG. 10 illustrates an example methodology for a device requesting a stream that receives in response a Session Announcement Protocol with Session Description Protocol data indicating the request was denied. For example, methodology 1000 may be implemented by requestor 102 (FIG. 1, FIG. 2), control logic 606 (FIG. 6) and/or computer system 800 FIG. 8).

At 1002, a request for a data stream is sent. The request may be sent via any suitable means. The request may either be granted or denied as illustrated at 1004.

If the request is granted (YES), as illustrated at 1006 the stream is received. In addition, SAP/SDP packets may be received as illustrated at 1008 that indicate a reason why the request was granted and/or status data. Status data may be provided at any time while subscribing to the stream via SAP/SDP packets.

If the request is denied (NO) at 1004, a SAP/SDP packet is received at 1010. The SDP data in the SAP packet is parsed to determine whether there is data indicating the request for the data stream was denied. For example, various fields, such as the session information field, can be searched to determine whether the word "denied" appears (and if the word "denied" appears in the title of the data stream that the word "denied" appears outside of the title of the stream). In particular embodiments, the SDP data fields are parsed to determine whether a reason for the denial was included. For example, the reason may be delimited by brackets ( ) or quotation marks " ". As another example, a predefined code may be employed to denote the reason the request was denied.

At 1012, data is output indicating that the request was denied. For example, if the requesting device has a user interface with a display, such as a Liquid Crystal Display (LCD), data may be displayed on the screen. As another example, if the requesting device has an audio output such as a speaker, an audio signal may be generated. Both audio and visual outputs may also be provided. in particular embodiments, the reason for the stream may also be output. For example, whether the stream was denied due to insufficient bandwidth, a lost connection between the requestor and the source of the stream, a maximum number of subscribed users has been exceeded, inadequate signal quality such as an insufficient data rate and/or insufficient signal strength (or "RSSI"), and/or the requestor is incapable of handling the request due to insufficient available resources and/or the logic processing the stream needs to be upgraded.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising
a transceiver;
logic coupled with the transceiver;
wherein the logic is configured to receive from an associated requestor via the transceiver a request for a data stream to be delivered to the associated requester;
wherein the logic is configured to determine whether to selectively grant the request and provide the data stream to the associated requestor;
wherein the logic determines not to provide the data stream to the associated requestor based on determining a current signal strength of a signal received from the associated requestor and determining from the signal strength that a link to the associated requestor is incapable of providing sufficient resources for the data stream;

wherein the logic is configured to send via the transceiver to the associated requester responsive to determining not to provide the data stream to the associated requestor a Session Announcement Protocol (SAP) packet comprising Session Description Protocol (SDP) data, the SDP data comprising data indicating that based on current signal strength the link to the associated requestor is incapable of providing sufficient resources for the data stream, wherein the SDP data comprises a Start time field and an End time field configured to store data representative of beginning and end times of the selective grant, respectively, and wherein the Start time field stores data representative of a time the logic determines not to provide the data stream to the associated requestor.

2. The apparatus of claim 1, wherein the data indicating a reason why the request was denied is placed into a SDP session name field.

3. The apparatus of claim 1, wherein the logic is further configured to send the SAP packet as a unicast packet.

4. The apparatus of claim 3, wherein a layer 2 address of the unicast packet comprises a layer 2 unicast address of the associated requestor.

5. The apparatus of claim 1, wherein the logic is further configured to receive
   a second request for the data stream via the transceiver from a second associated requestor that is granted; and
   wherein the logic is further configured to send at least one SAP packet comprising SDP data to the second associated requestor with data representative of a status of the data stream after granting the second request.

6. The apparatus of claim 5, wherein the SDP data further comprises data representative of a Start time and a End time; and
   wherein the logic is further configured to determine a time period that the request was granted based on the Start time and End time.

7. The apparatus of claim 1, wherein the logic is further configured to encrypt the SAP packet with a client key.

8. The apparatus of claim 1, wherein the logic determines not to provide the data stream to the associated requestor based on determining available bandwidth for the requestor is insufficient; and
   wherein the SDP data comprises data indicating that available bandwidth for the associated requestor is insufficient.

9. The apparatus of claim 1, wherein the logic determines not to provide the data stream to the associated requestor based on determining available data rate for the associated requestor is insufficient; and
   wherein the SDP data comprises data indicating that available data rate for the associated requestor is insufficient.

10. The apparatus of claim 1, wherein the logic determines not to provide the data stream to the associated requestor based on determining a break in a connection between a source of the data stream and the associated requestor; and
    wherein the SDP data comprises data indicating a break in a connection between a source of the data stream and the associated requestor.

11. The apparatus of claim 1, wherein the logic determines not to provide the data stream to the associated requestor based on determining the associated requestor does not have sufficient resources for the data stream; and
    wherein the SDP data comprises data indicating that the associated requestor does not have sufficient resources for the data stream.

12. The apparatus of claim 1, wherein the data stream is one of a group consisting of a video stream, an audio stream, an audiovisual stream, and a voice over interne protocol (VoIP) stream.

13. A method, comprising:
    receiving from an associated requestor a request for a data stream to be delivered to the associated requestor;
    determining, by a processor, that the request for the data stream is to be selectively granted based on determining a current signal strength of a signal received from the associated requestor, and determining to deny the request based on the signal strength indicating that a link to the associated requestor is incapable of providing sufficient resources for the data stream;
    generating, by a processor, a Session Announcement Protocol (SAP) packet comprising Session Description Protocol (SDP) data, wherein the SDP data comprises data indicating the request for the data stream was denied based on the link to the associated requestor being incapable of providing sufficient resources for the data stream, wherein the SDP data comprises a Start time field and an End time field configured to store data representative of beginning and end times of the selective grant, respectively, and wherein the Start time field stores data representative of a time the request for the data stream is denied; and
    sending the SAP packet with the SDP data to the associated requestor.

14. The method of claim 13, wherein the sending the SAP packet comprises sending the SAP packet as a Layer 2 unicast packet addressed to the associated requestor.

15. An apparatus, comprising:
    a transceiver configured to communicate with an associated source of a stream;
    logic coupled with the transceiver and when executed operable to:
    send to the associated source of the stream a request for delivery of the stream to the apparatus; receive a Session Announcement Protocol packet with Session Description Protocol data, wherein the SDP data comprises a Start time field and an End time field configured to store data representative of beginning and end times of the requested delivery of the stream, respectively, and wherein the Start time field stores data representative of a time the request for the data stream is denied; and
    selectively determine from the Session Description Protocol (SDP) data a reason why the request for the stream was denied, wherein the reason comprises a determination by the associated source of the requested stream of a current signal strength of a signal received from the apparatus, and a determination by the associated source of the requested stream based on the determined the signal strength that a communication link with the apparatus is incapable of providing sufficient resources for the data stream; wherein the logic determines why the request was denied by searching the SDP data for a predefined or preformatted string.

16. The apparatus set forth in claim 15, further comprising a user interface, wherein the logic is further operable to output on the user interface data indicating the request for the stream was denied.

17. The apparatus set forth in claim 15, wherein the logic searches for a text encapsulated by one of a group consisting of quotation marks or brackets in a session name (s=) field.

18. The apparatus set forth in claim 1, wherein the reason for not providing the data stream is selected from a group consisting of exceeded maximum number of users for the stream, insufficient data rate, and the requestor is incapable of processing the data stream.

* * * * *